United States Patent [19]

Miyazaki

[11] Patent Number: 5,576,889

[45] Date of Patent: Nov. 19, 1996

[54] REAL-IMAGE ZOOM FINDER OPTICAL SYSTEM

[75] Inventor: Kyoichi Miyazaki, Sennan, Japan

[73] Assignee: Minolta Co., Ltd., Osaka, Japan

[21] Appl. No.: 346,574

[22] Filed: Nov. 29, 1994

[30] Foreign Application Priority Data

Dec. 1, 1993 [JP] Japan .................................. 5-301986

[51] Int. Cl.⁶ .......................... G02B 15/14; G03B 13/08
[52] U.S. Cl. ...................... 359/686; 359/676; 359/678; 396/379
[58] Field of Search .................... 359/678, 686, 359/691, 676; 354/219, 224

[56] References Cited

U.S. PATENT DOCUMENTS

| | | | |
|---|---|---|---|
| 5,005,955 | 4/1991 | Ohshita | 359/676 |
| 5,257,129 | 10/1993 | Morooka et al. | 359/676 |
| 5,359,377 | 10/1994 | Kamo | 359/676 |
| 5,448,411 | 9/1995 | Morooka | 359/676 |
| 5,495,365 | 2/1996 | Morooka | 354/224 |

FOREIGN PATENT DOCUMENTS

| | | |
|---|---|---|
| 1131510 | 5/1989 | Japan . |
| 1116616 | 9/1989 | Japan . |
| 3255415 | 11/1991 | Japan . |
| 453914 | 2/1992 | Japan . |
| 4194913 | 7/1992 | Japan . |
| 4204911 | 7/1992 | Japan . |
| 4230719 | 8/1992 | Japan . |
| 4219711 | 8/1992 | Japan . |

*Primary Examiner*—Georgia Y. Epps
*Assistant Examiner*—Evelyn A. Lester
*Attorney, Agent, or Firm*—Price, Gess & Ubell

[57] ABSTRACT

A finder optical system of the present invention includes from the object side an objective lens system of a positive refractive power and an eyepiece system of a positive refractive power. The objective lens system includes from the object side a first lens unit of a negative refractive power, a second lens unit of a positive refractive power and a third lens unit of a positive refractive power. Zooming is performed by moving the first and second lens units. Each of the first and second lens units includes a single lens having at least one aspherical surface. The third lens unit includes a lens prism at least an incident surface of which is an aspherical surface.

12 Claims, 12 Drawing Sheets

Fig. 4
WIDE
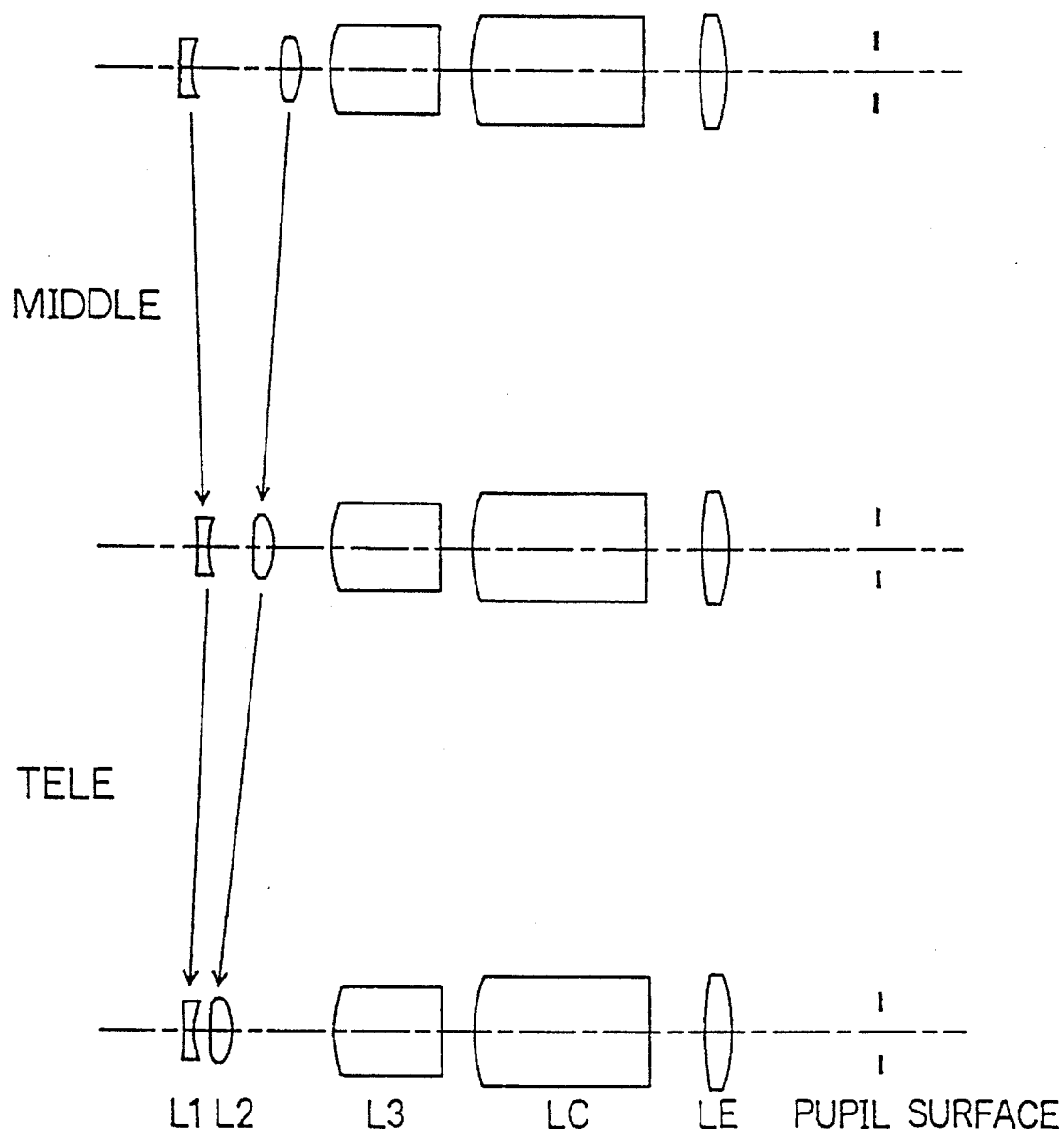
MIDDLE
TELE
L1 L2    L3    LC    LE    PUPIL SURFACE

SPHERICAL ABERRATION

HEIGHT=−2298.00mm

ASTIGMATISM

HEIGHT=−2298.00mm

DISTORTION

SPHERICAL ABERRATION

HEIGHT=−1594.00mm

ASTIGMATISM

HEIGHT=−1594.00mm

DISTORTION

SPHERICAL ABERRATION

HEIGHT=−1103.00mm

ASTIGMATISM

HEIGHT=−1103.00mm

DISTORTION

-1.00   1.00
(diopter)
SPHERICAL
ABERRATION

HEIGHT=-1970.00mm

-1.00   1.00
(diopter)
ASTIGMATISM

HEIGHT=-1970.00mm

-5.00   5.00
(%)
DISTORTION

-1.00   1.00
(diopter)
SPHERICAL
ABERRATION

HEIGHT=-1232.80mm

-1.00   1.00
(diopter)
ASTIGMATISM

HEIGHT=-1232.80mm

-5.00   5.00
(%)
DISTORTION

-1.00   1.00
(diopter)
SPHERICAL
ABERRATION

HEIGHT=-780.00mm

-1.00   1.00
(diopter)
ASTIGMATISM

HEIGHT=-780.00mm

-5.00   5.00
(%)
DISTORTION

-1.00   1.00
(diopter)
SPHERICAL
ABERRATION

HEIGHT=-1970.00mm

—— DS
---- DT

-1.00   1.00
(diopter)
ASTIGMATISM

HEIGHT=-1970.00mm

-5.00   5.00
(%)
DISTORTION

—— E-line

-1.00   1.00
(diopter)
SPHERICAL
ABERRATION

HEIGHT=-1233.00mm

—— DS
---- DT

-1.00   1.00
(diopter)
ASTIGMATISM

HEIGHT=-1233.00mm

-5.00   5.00
(%)
DISTORTION

—— E-line

-1.00   1.00
(diopter)
SPHERICAL
ABERRATION

HEIGHT=-780.00mm

—— DS
---- DT

-1.00   1.00
(diopter)
ASTIGMATISM

HEIGHT=-780.00mm

-5.00   5.00
(%)
DISTORTION

-1.00   1.00
(diopter)
SPHERICAL
ABERRATION

HEIGHT=-1970.00mm

-1.00   1.00
(diopter)
ASTIGMATISM

HEIGHT=-1970.00mm

-5.00   5.00
(%)
DISTORTION

-1.00   1.00
(diopter)
SPHERICAL
ABERRATION

HEIGHT=-1233.00mm

-1.00   1.00
(diopter)
ASTIGMATISM

HEIGHT=-1233.00mm

-5.00   5.00
(%)
DISTORTION

-1.00   1.00
(diopter)
SPHERICAL
ABERRATION

HEIGHT=-780.00mm

-1.00   1.00
(diopter)
ASTIGMATISM

HEIGHT=-780.00mm

-5.00   5.00
(%)
DISTORTION

-1.00  1.00
(diopter)
SPHERICAL ABERRATION

HEIGHT=-1970.00mm

-1.00  1.00
(diopter)
ASTIGMATISM

HEIGHT=-1970.00mm

-5.00  5.00
(%)
DISTORTION

-1.00  1.00
(diopter)
SPHERICAL ABERRATION

HEIGHT=-1233.00mm

-1.00  1.00
(diopter)
ASTIGMATISM

HEIGHT=-1233.00mm

-5.00  5.00
(%)
DISTORTION

-1.00  1.00
(diopter)
SPHERICAL ABERRATION

HEIGHT=-780.00mm

-1.00  1.00
(diopter)
ASTIGMATISM

HEIGHT=-780.00mm

-5.00  5.00
(%)
DISTORTION

SPHERICAL ABERRATION

ASTIGMATISM
(SAGITTAL DIRECTION)

ASTIGMATISM
(MERIDIONAL DIRECTION)

SPHERICAL ABERRATION

ASTIGMATISM
(SAGITTAL DIRECTION)

ASTIGMATISM
(MERIDIONAL DIRECTION)

SPHERICAL ABERRATION

ASTIGMATISM
(SAGITTAL DIRECTION)

ASTIGMATISM
(MERIDIONAL DIRECTION)

5,576,889

REAL-IMAGE ZOOM FINDER OPTICAL SYSTEM

BACKGROUND OF THE INVENTION

1. Field of the Invention

The present invention relates to a finder optical system for use in a camera, and more particularly, to a compact real-image zoom finder optical system.

2. Description of the Prior Art

In recent years, because of a reduction in size, an increase in zoom ratio and a popularity of panorama-size photos in lens shutter cameras, a wide-angle and high-zoom-ratio zoom lens for use in a lens shutter camera has been greatly required having a zoom range from wide angle (approximately 28 mm) to middle telephoto (70 mm or greater). This is also required for finder optical systems.

In view of cost, the most advantageous arrangement for a finder objective lens system is a two-unit arrangement of negative, positive configuration. In this arrangement, however, the movement amount of the lens increases as the zoom ratio increases, so that a desired size reduction cannot be achieved. To realize a compact objective lens system, it has been considered necessary to use a positive second lens unit as a strong-power lens including an aspherical surface. However, the manufacture of lenses of such an arrangement is difficult since the aberration sensitivity to errors drastically increases.

Conventionally, as a solution for the achievement of the compactness and high zoom ratio, many finder objective lens systems have been proposed which include many lens units (three unit, four unit or more) or many lens elements (e.g. two units, four elements). For example, Japanese Laid-open Patent Applications Nos. H1-116616, H1-131510, H3-255415, H4-53914, H4-219711 and H4-230719 each realize a high zoom ratio by adding a positive third lens unit to a two-unit arrangement of negative, positive configuration. These prior arts realize the compactness and high zoom ratio by increasing the number of lens elements rather than by providing an aspherical surface in the zoom lens having a strong refractive power. These arrangements, however, is defective since cost increases, ghost due to the reflection of light between surfaces is generated because of the increase in number of lens elements and the finder image is dark due to the reduction in transmittance.

SUMMARY OF THE INVENTION

An object of the present invention is to provide a compact and high-zoom-ratio real-image zoom finder that can be realized without any need to increase the number of lens elements.

To achieve the above-mentioned object, the real-image zoom finder optical system of the present invention comprises from the object side an objective lens system of a positive refractive power and an eyepiece system of a positive refractive power. The objective lens system includes from the object side a first lens unit of a negative refractive power, a second lens unit of a positive refractive power and a third lens unit of a positive refractive power. Zooming is performed by moving the first and second lens units along the optical system. Each of the first and second lens units comprises a single lens including at least one aspherical surface, and the third lens unit includes a lens prism which has at least one reflecting surface and at least an incident surface of which is an aspherical surface.

The incident surface of the lens prism preferably serves as a real image formed surface.

Moreover, the aspherical surface used as the incident surface of the lens prism preferably has a curvature increasing from the center to the edge along a height.

Further, the second and third lens units of the objective lens system preferably fulfill the following condition:

$$1 < \frac{\phi_{30}}{\phi_{20}} < 1.6$$

where $\phi_{n0}$ is the refractive power of the most object side surface of an nth lens unit, and $$\phi_{n0} = \frac{N_{n0} - 1}{r_{n0}}$$

where $N_{n0}$ is the refractive index of the most object side lens element or lens prism of the nth lens unit, and $r_{n0}$ is the radius of curvature of the most object side surface of the nth lens unit.

The finder optical system of the present invention is provided with an objective lens system of a three-unit arrangement of negative, positive, positive configuration having a third lens unit including a lens prism whose incident surface is an aspherical surface of a strong refractive power, so that an objective lens system including only two lens elements can be realized. As a result, a compact, high-zoom-ratio and low-cost finder optical system is realized.

BRIEF DESCRIPTION OF THE DRAWINGS

This and other objects and features of this invention will become clear from the following description, taken in conjunction with the preferred embodiments with reference to the accompanied drawings in which:

FIG. 4 shows the lens arrangement of the fourth embodiment of the present invention;

DESCRIPTION OF THE PREFERRED EMBODIMENTS

Figure 1:
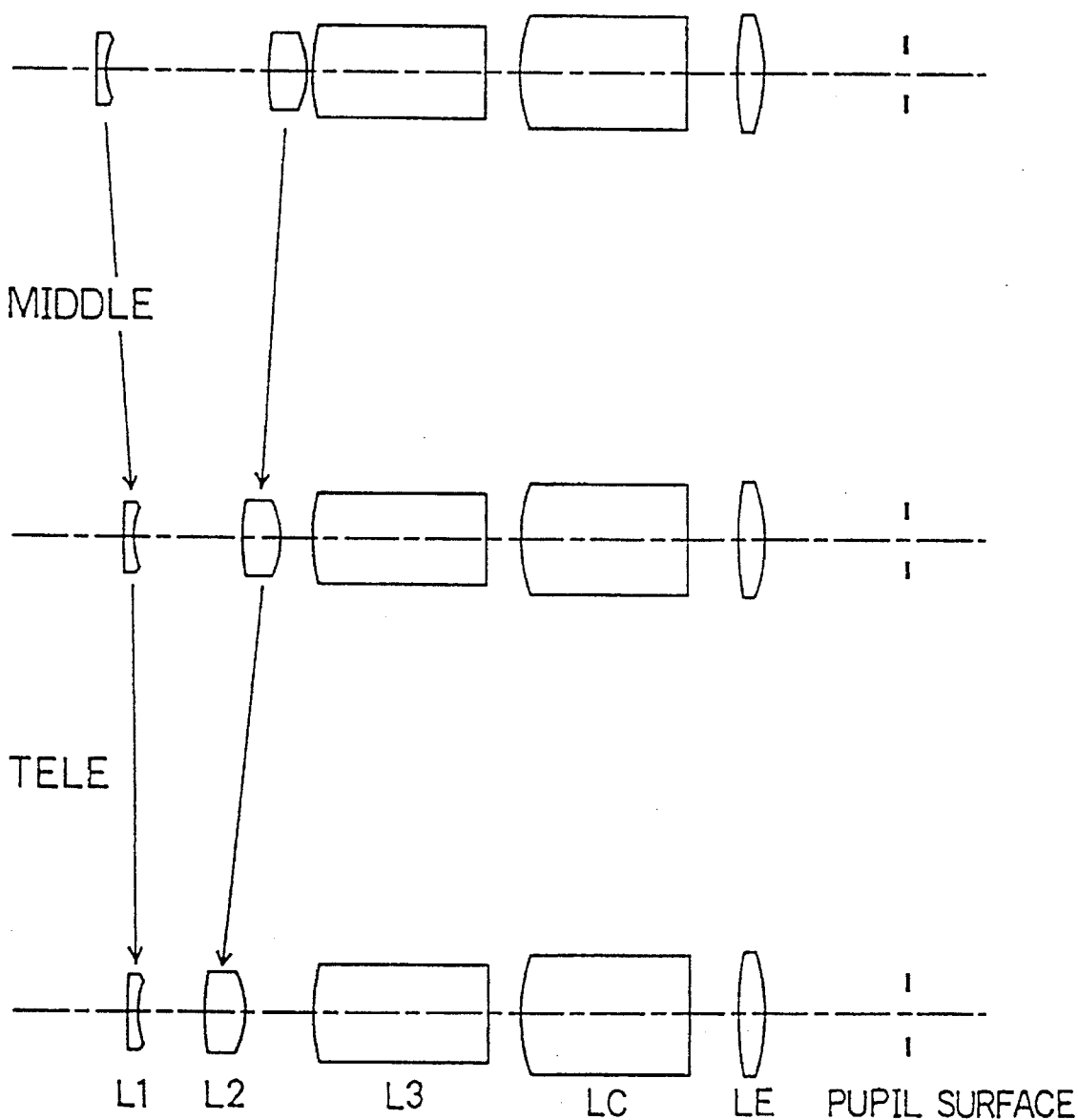
FIG. 1 shows the lens arrangement of the first embodiment of the present invention.
Figure 2:
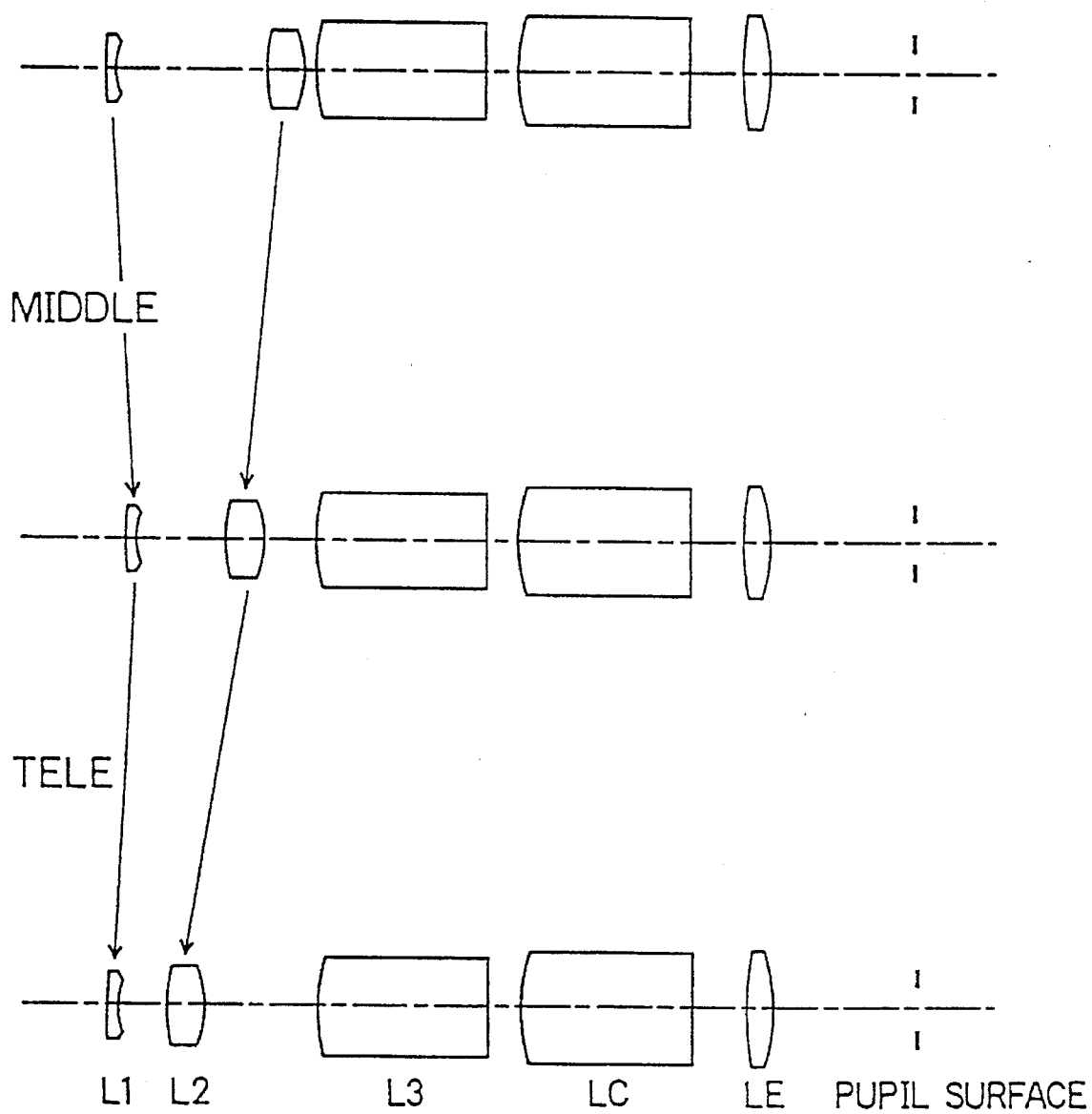
FIG. 2 shows the lens arrangement of the second embodiment of the present invention.
Figure 3:
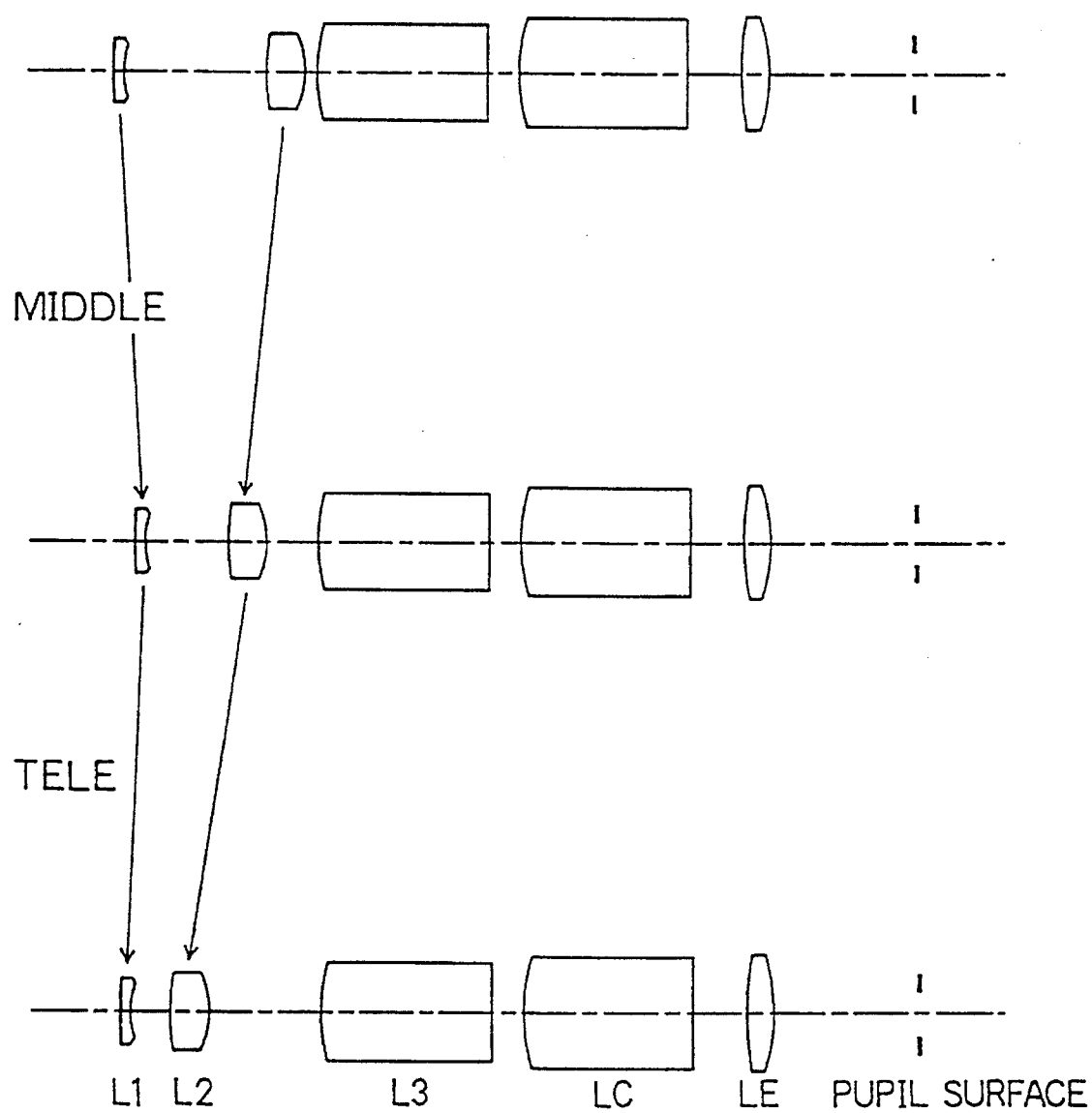
FIG. 3 shows the lens arrangement of the third embodiment of the present invention.
Figure 5:
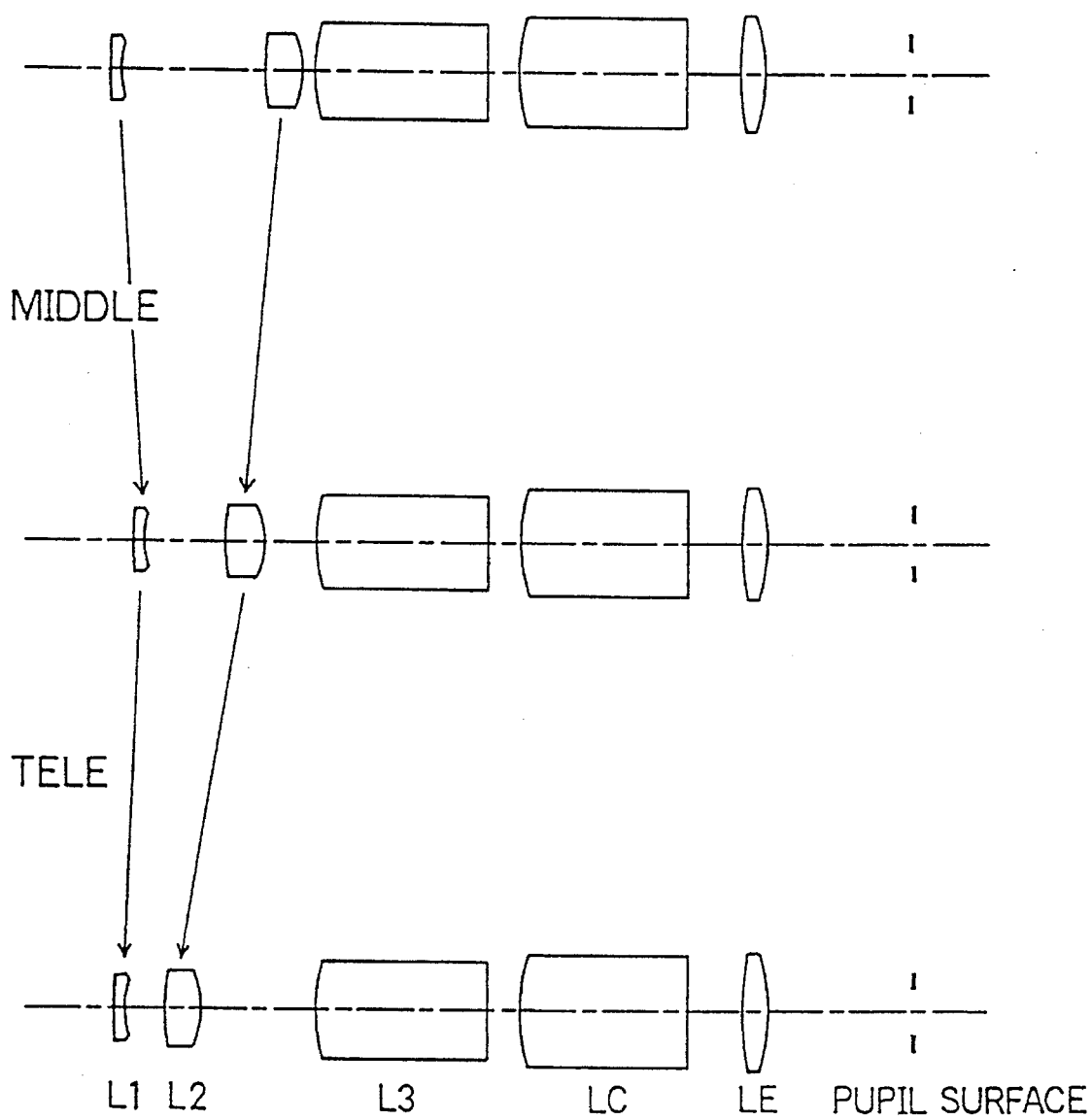
FIG. 5 shows the lens arrangement of the fifth embodiment of the present invention.
Figure 6A:
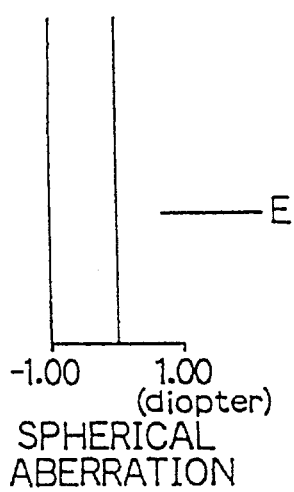
FIGS. 6A to 6C show aberration curves of the first embodiment at the shortest focal length condition.
Figure 6B:
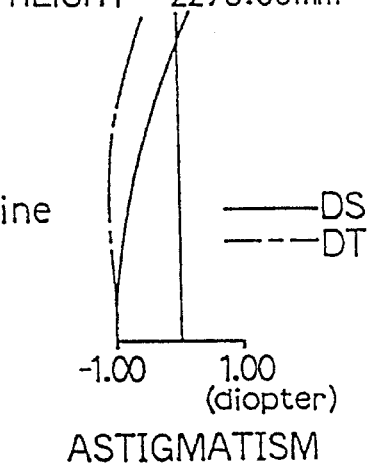
Figure 6C:
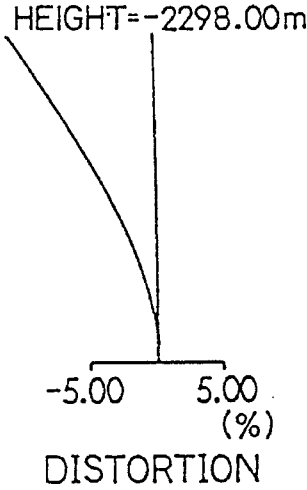
Figure 6D:
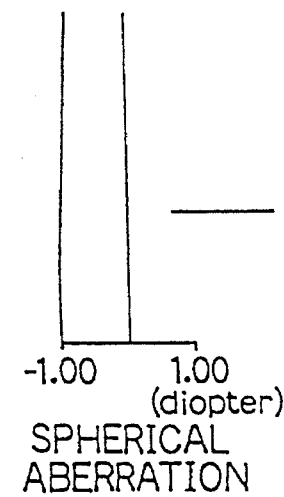
FIGS. 6D to 6F show aberration curves of the first embodiment at the middle focal length condition.
Figure 6E:
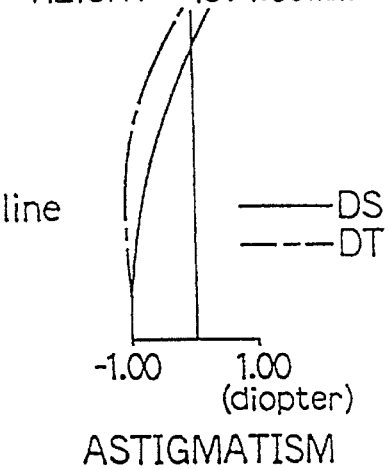
Figure 6F:
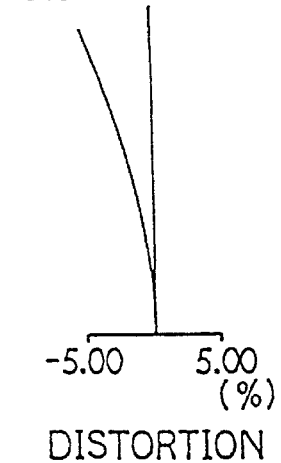
Figure 6G:
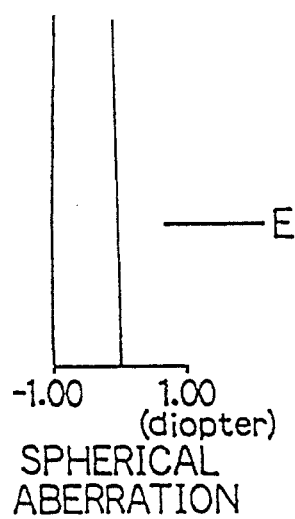
FIGS. 6G to 6I show aberration curves of the first embodiment at the longest focal length condition.
Figure 6H:
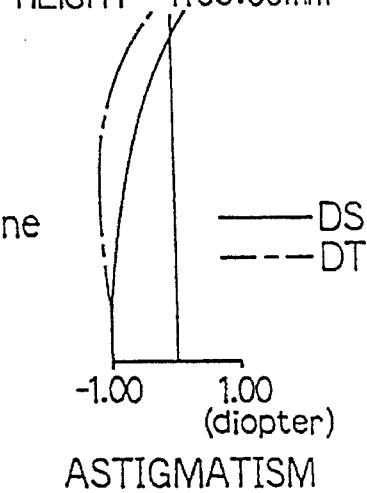
Figure 6I:
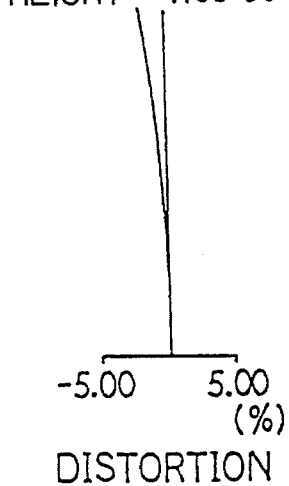
Figure 7A:
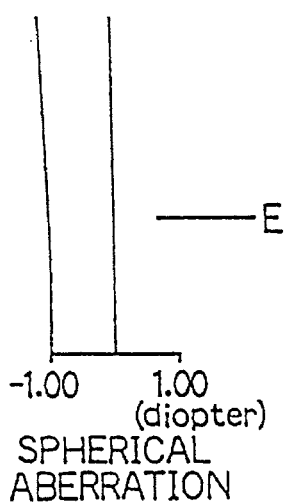
FIGS. 7A to 7C show aberration curves of the second embodiment at the shortest focal length condition.
Figure 7B:
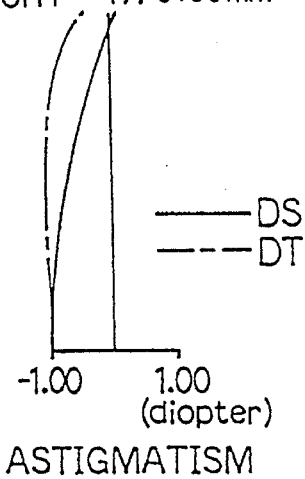
Figure 7C:
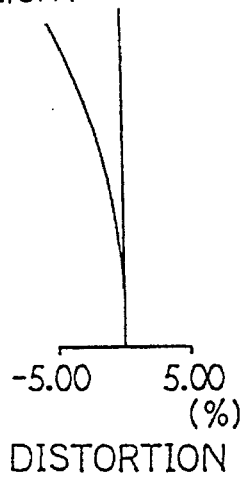
Figure 7D:
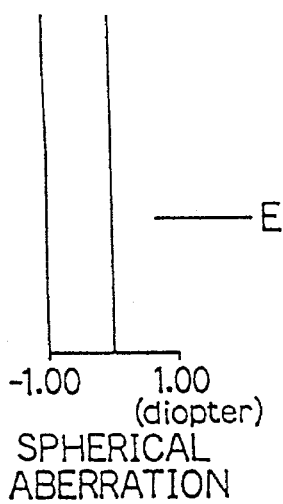
FIGS. 7D to 7F show aberration curves of the second embodiment at the middle focal length condition.
Figure 7E:
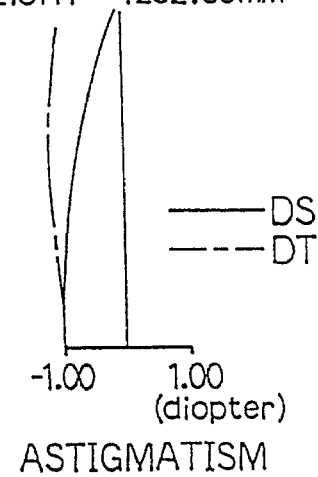
Figure 7F:
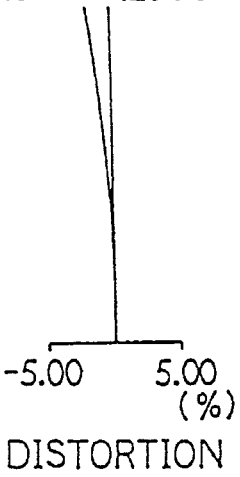
Figure 7G:
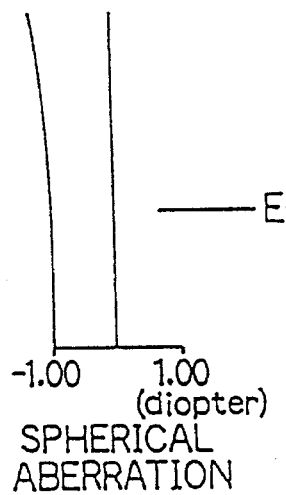
FIGS. 7G to 7I show aberration curves of the second embodiment at the longest focal length condition.
Figure 7H:
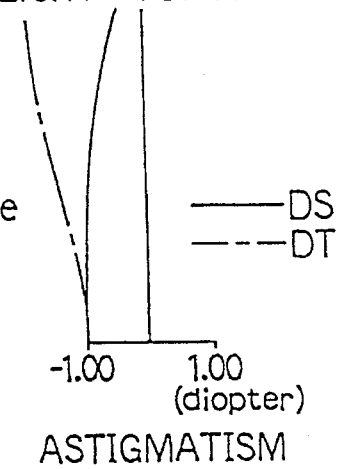
Figure 7I:
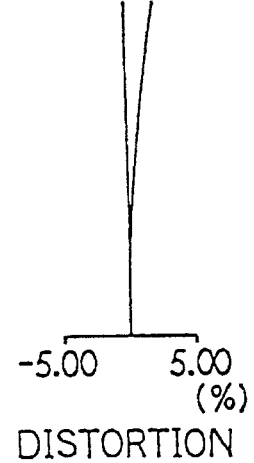
Figure 8A:
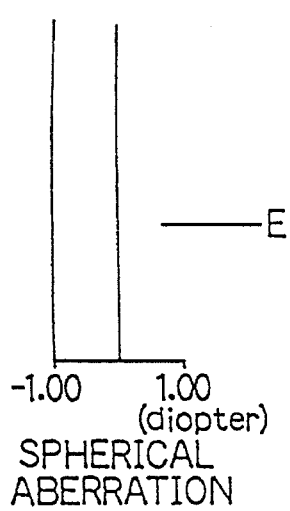
FIGS. 8A to 8C show aberration curves of the third embodiment at the shortest focal length condition.
Figure 8B:
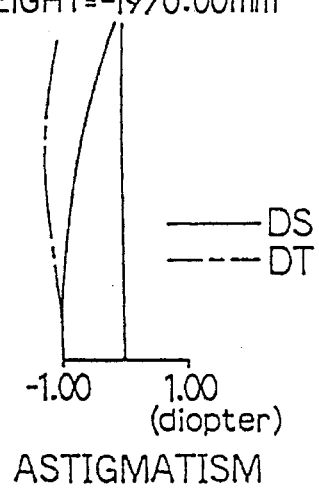
Figure 8C:
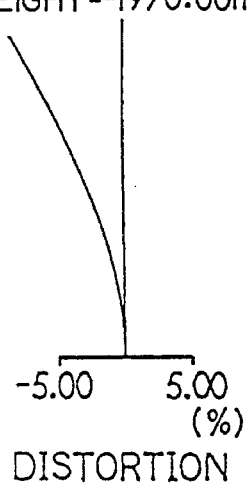
Figure 8D:
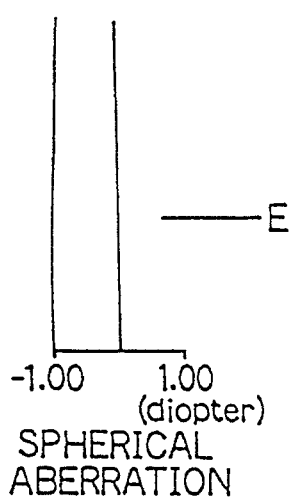
FIGS. 8D to 8F show aberration curves of the third embodiment at the middle focal length condition.
Figure 8E:
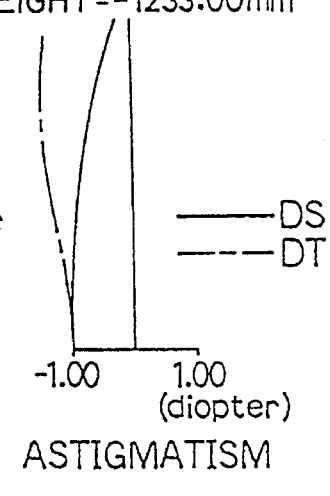
Figure 8F:
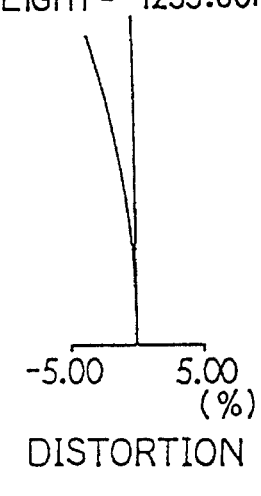
Figure 8G:
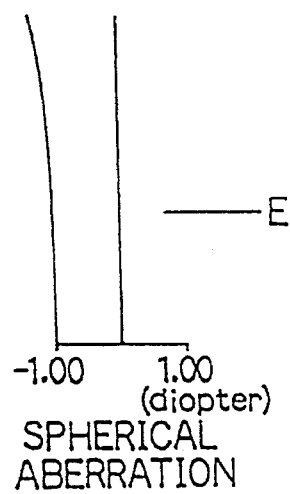
FIGS. 8G to 8I show aberration curves of the third embodiment at the longest focal length condition.
Figure 8H:
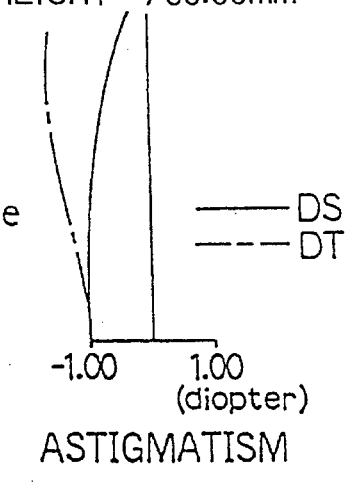
Figure 8I:
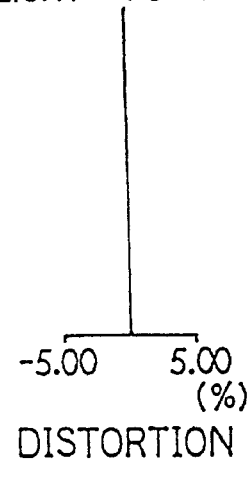
Figure 9A:
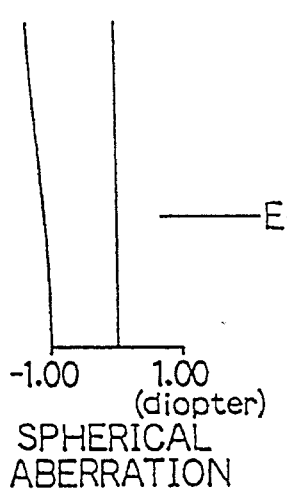
FIGS. 9A to 9C show aberration curves of the fourth embodiment at the shortest focal length condition.
Figure 9B:
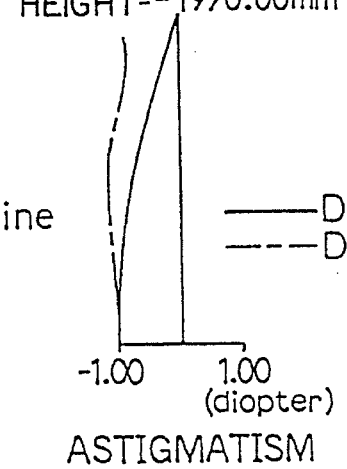
Figure 9C:
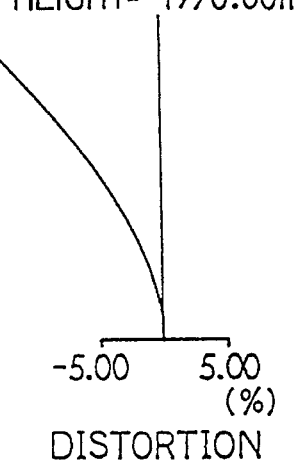
Figure 9D:
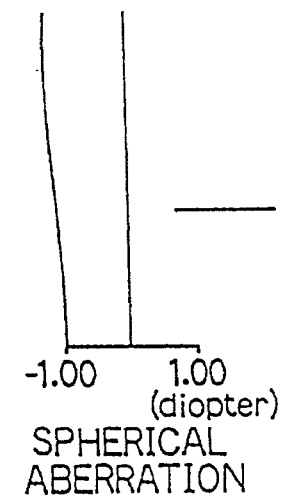
FIGS. 9D to 9F show aberration curves of the fourth embodiment at the middle focal length condition.
Figure 9E:
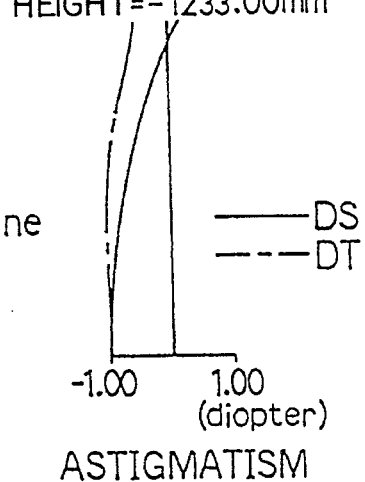
Figure 9F:
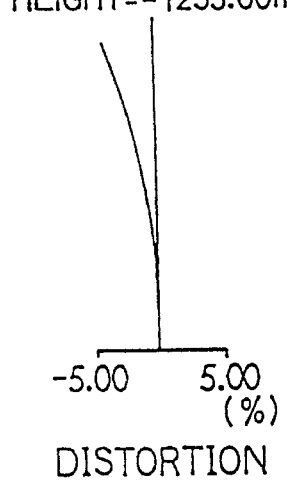
Figure 9G:
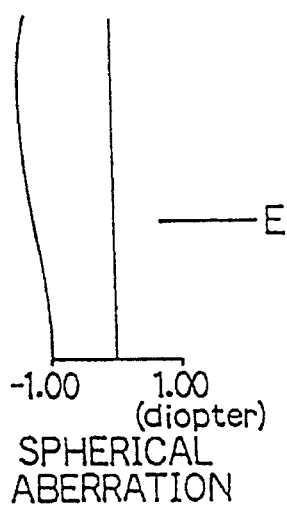
FIGS. 9G to 9I show aberration curves of the fourth embodiment at the longest focal length condition.
Figure 9H:
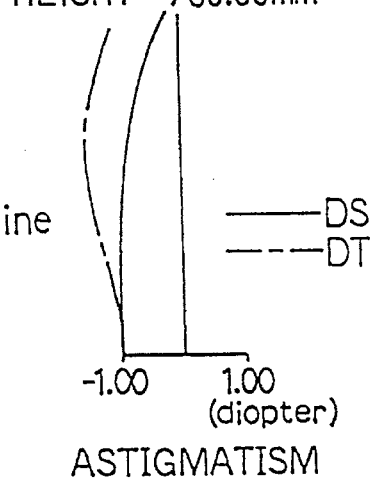
Figure 9I:
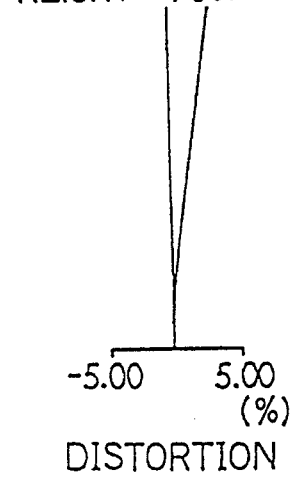
Figure 10A:
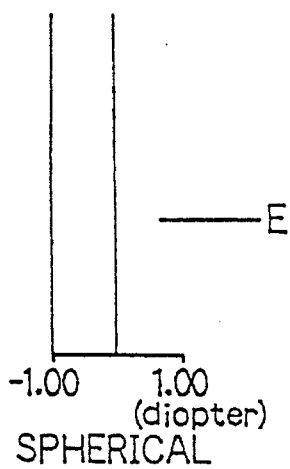
FIGS. 10A to 10C show aberration curves of the fifth embodiment at the shortest focal length condition.
Figure 10B:
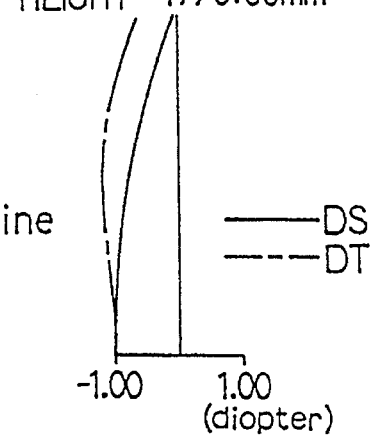
Figure 10C:
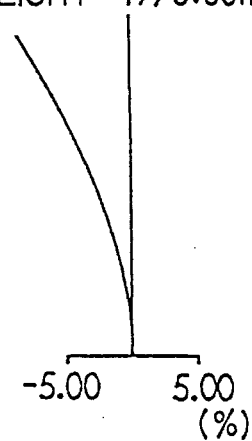
Figure 10D:
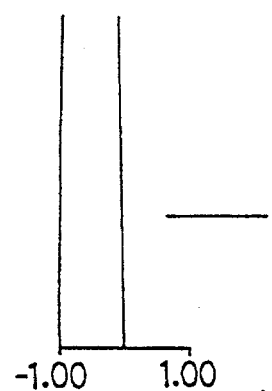
FIGS. 10D to 10F show aberration curves of the fifth embodiment at the middle focal length condition.
Figure 10E:
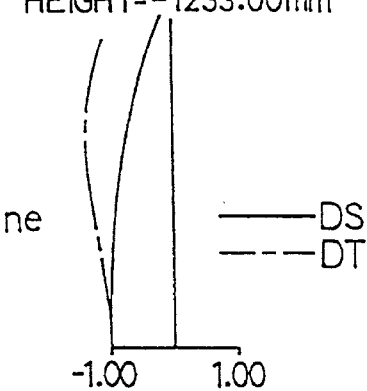
Figure 10F:
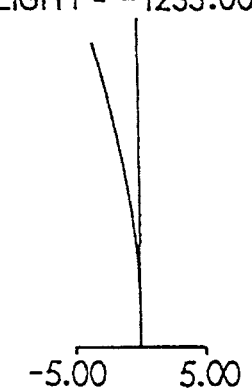
Figure 10G:
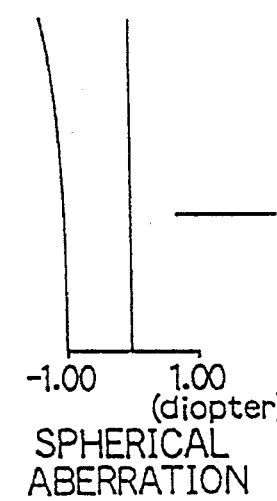
FIGS. 10G to 10I show aberration curves of the fifth embodiment at the longest focal length condition.
Figure 10H:
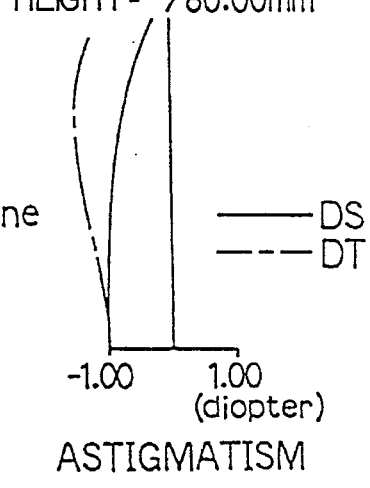
Figure 10I:
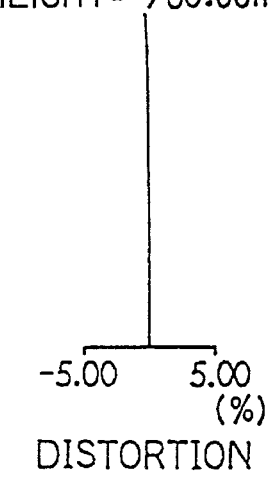

Hereinafter, embodiments of the present invention will be described with reference to the drawings. The finder optical system of the present invention has an objective lens system of a three-unit arrangement of negative, positive, positive configuration including from the object side a first lens unit of a negative refractive power, a second lens unit of a positive refractive power and a third lens unit of a positive refractive power including an erecting prism of a relatively strong curvature disposed on the object side of a real image. Zooming is performed by moving the first and second lens units along the optical axis.

Generally, it is known that in an objective lens system of negative, positive, positive configuration, negative distortion is difficult to correct since it is generated in all the lens units. When the zoom ratio is further increased, the negative distortion should particularly sufficiently be corrected since the image is deformed due to the distortion gap during zooming rather than the distortion absolute value so that photographers feel that something is wrong. In this arrangement, in the first and third lens units, the position where the luminous flux passes is largely varied compared to the second lens unit according to the image height of a real image formed by the objective lens system. For this reason, the first and third lens units are more suitable for distortion correction.

In the present invention, aspherical surfaces are efficiently used in the first and third lens units suitable for distortion correction. By providing in the first lens unit at least one aspherical surface as described below, distortion at a shorter focal length condition is preponderantly corrected to correct the distortion gap.

<For the first surface>

When the first surface is convex to the object side, an aspherical surface is provided having a curvature decreasing from the center to the edge along the height. When the first surface is concave to the object side, an aspherical surface is provided having a curvature increasing from the center to the edge along the height.

<For the second surface>

When the second surface is convex to the object side, an aspherical surface is provided having a curvature decreasing from the center to the edge along the height. When the second surface is concave to the object side, an aspherical surface is provided having a curvature increasing from the center to the edge along the height.

The third lens unit comprises an erecting prism of an appropriate refractive power whose incident surface is an aspherical surface having a curvature increasing from the center to the edge along the height. Since the positions of the luminous fluxes passing through the third lens unit do not change for the same image height even when zooming is performed, distortion is corrected by the same amount irrespective of zooming.

Further, according to the present invention, by increasing the refractive power of the positive second lens unit, the movement amounts of the lenses for zooming are reduced, thereby achieving a compact arrangement. By using an aspherical surface as the incident surface of the lens prism constituting the positive lens unit, the error sensitivity of the second lens unit is restrained although the second lens unit has a strong refractive power. As a result, aberrations is excellently corrected.

Preferably, the aspherical surface of the third lens unit has a relatively strong power. However, if the power is too strong, it is necessary to reduce the power of the second lens unit, which results in an increase in total length of the optical system. Therefore, the following condition is preferably fulfilled:

$$1 < \frac{\phi_{30}}{\phi_{20}} < 1.6 \qquad (1)$$

where $\phi_{n0}$ is the refractive power of the most object side surface of an nth lens unit, and $$\phi_{n0} = \frac{N_{n0} - 1}{r_{n0}}$$

where $N_{n0}$ is the refractive index of the most object side lens element or lens prism of the nth lens unit, and $r_{n0}$ is the radius of curvature of the most object side surface of the nth lens unit.

When the lower limit of the condition (1) is exceeded, negative distortion due to the second lens unit increases, so that the effect of the aspherical surface of the third lens unit decreases. When the upper limit of the condition (1) is exceeded, astigmatism gap increases, which results in an increase in total length of the optical system.

Specific numerical data of first to fifth embodiments of the real-image zoom finder according to the present invention are shown in Tables 1 to 5. In each embodiment, zooming is performed by moving the first and second lens units along the optical axis. In each table, surface Nos. 1 to 11 represent first to eleventh surfaces counted from the object side (the eleventh surface is the pupil surface), and CR represents the radius of curvature of each surface. T represents the axial distance. Ne and νe respectively represent the refractive index and Abbe number of each lens to the d-line. The surfaces marked with asterisks (*) are aspherical. As the aspherical data, variables are shown defined by the following expression when the distance from the vertex of the aspherical surface at a height Y from the optical axis is X:

$$X = \frac{Y^2}{r_0 + (r_0^2 + \epsilon Y^2)^{\frac{1}{2}}} + \Sigma A i l Y^i$$

where $r_0$ is a paraxial radius of curvature.

FIGS. 1 to 5 show the lens arrangements of the first to fifth embodiments at the shortest focal length condition (WIDE), at the middle focal length condition (MIDDLE) and at the longest focal length condition (TELE). In each embodiment, the lens units moved for zooming are the first and second lens units L1 and L2 included in the objective lens system. In the figures, the movements of the lens units from the shortest to the longest focal length condition are shown by the arrows.

The first to third and fifth embodiments comprise from the object side: an objective optical system including a first lens L1 which is a negative meniscus lens element concave to the pupil side, a second lens L2 which is a positive bi-convex lens, and a third lens L3 which is a plano-convex lens convex to the object side which also serves as an object side unit of a Porro prism used as an erecting optical system; a condenser lens LC which is a plano-convex lens convex to the object side which also serves as a pupil side unit of the Porro prism used as the erecting optical system; and an eyepiece LE which is a positive bi-convex lens. In the first, third and fifth embodiments, the following surfaces are aspherical: the object side surface of the first lens L1, the pupil side surface of the second lens L2, the object side surface of the third lens L3, and the object side surface of the eyepiece LE. In the second embodiment, the following surfaces are aspherical: the both side surfaces of the first lens L1, the pupil side surface of the second lens L2, the object side surface of the third lens L3, and the object side surface of the eyepiece LE.

The fourth embodiment comprises from the object side: an objective lens system including a first lens L1 which is a negative bi-concave lens element, a second lens L2 which is a positive bi-convex lens element, and a third lens L3 which is a plano-convex lens convex to the object side which serves as an object side unit of a Porro prism used as an erecting optical system; a condenser lens LC which is a plano-convex lens convex to the object side which also serves as a pupil side unit of the Porro prism used as the erecting prism; and an eyepiece LE which is a positive bi-convex lens element. In the fourth embodiment, the following surfaces are aspherical: the object side surface of the first lens L1, the both side surfaces of the second lens L2, the object side surface of the third lens L3, and the object side surface of the eyepiece LE.

FIGS. 6A to 6I through 10A to 10I show aberration curves of the first to fifth embodiments.

Figure 11:
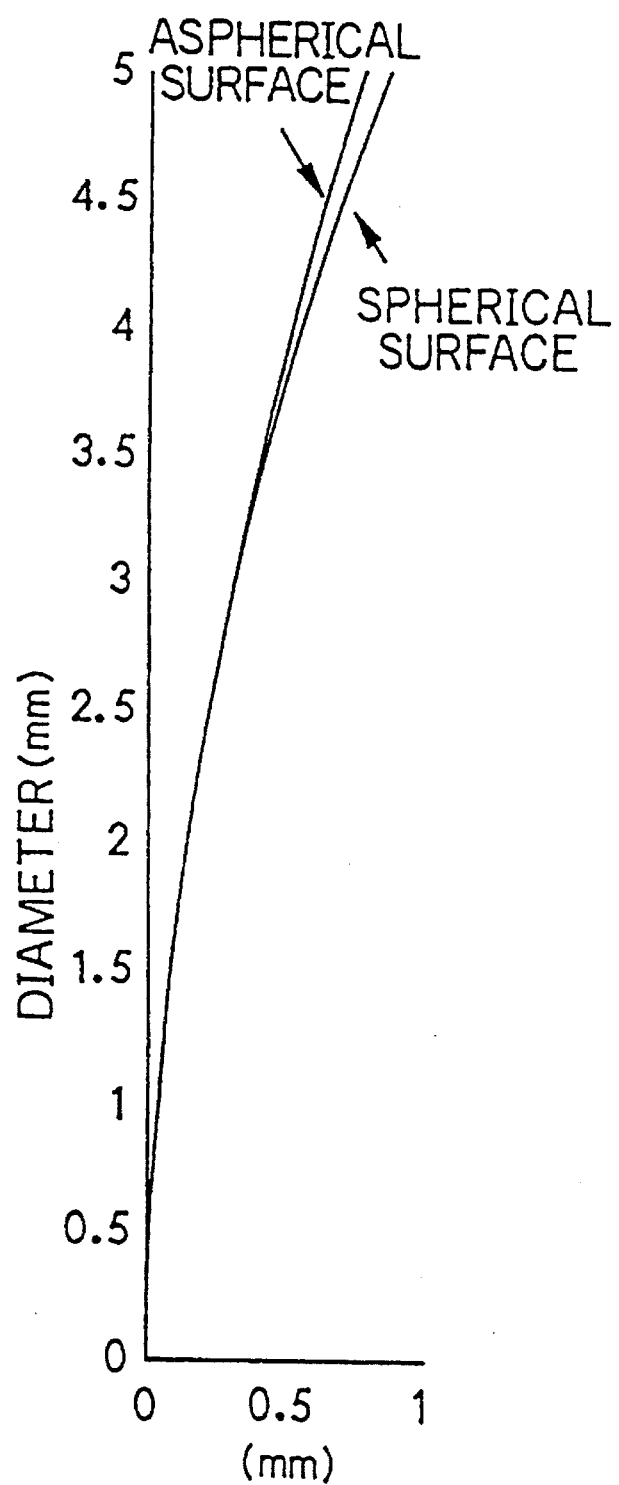
FIG. 11 shows a configuration of an aspherical surface used as the incident surface of the lens prism of the embodiments of the present invention.
Figure 12A:
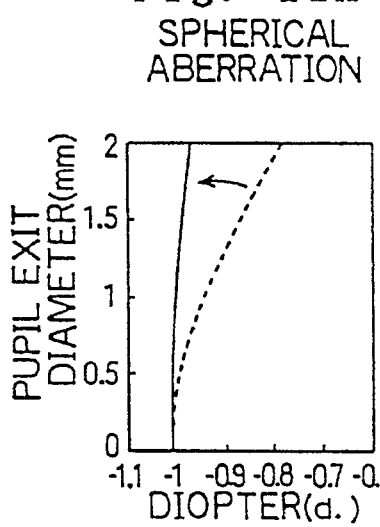
FIGS. 12A to 12C shows differences in aberrations between a spherical incident surface of the lens prism and an aspherical incident surface thereof at the shortest focal length condition in the first embodiment of the present invention.
Figure 12B:
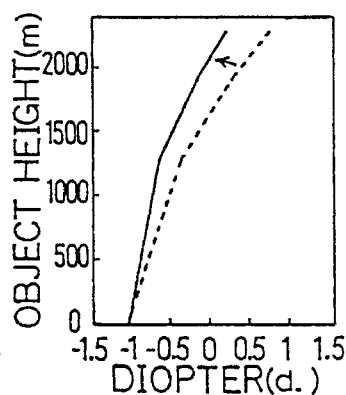
Figure 12C:
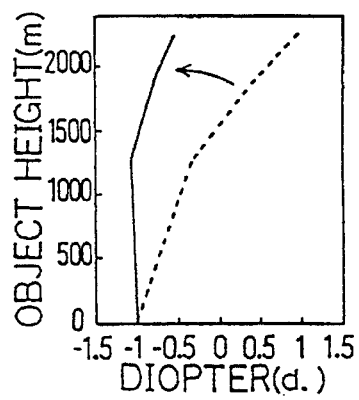
Figure 12D:
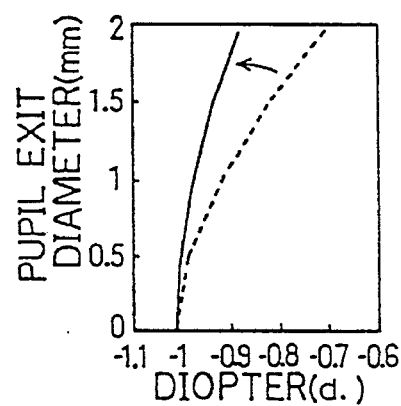
FIGS. 12D to 12F show differences in aberrations between a spherical incident surface of the lens prism and an aspherical incident surface thereof at the middle focal length condition in the first embodiment of the present invention.
Figure 12E:
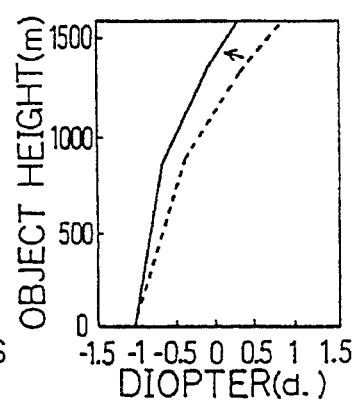
Figure 12F:
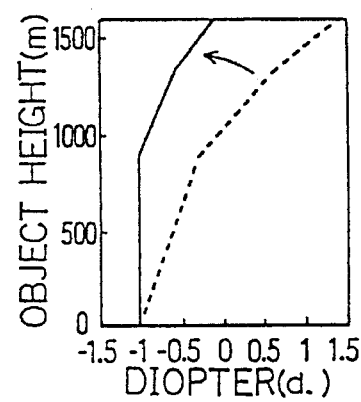
Figure 12G:
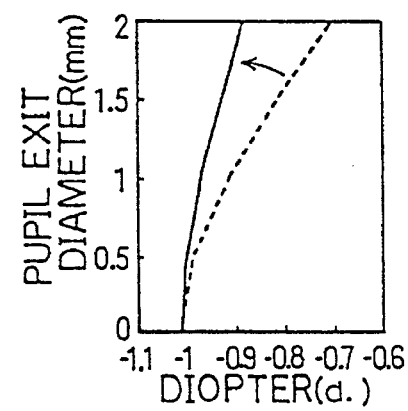
FIGS. 12G to 12I show differences in aberrations between a spherical incident surface of the lens prism and an aspherical incident surface thereof at the longest focal length condition in the first embodiment of the present invention.
Figure 12H:
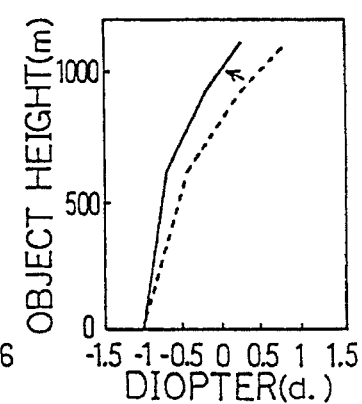
Figure 12I:
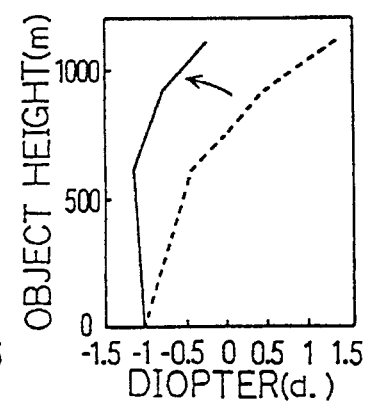

FIG. 11 shows a configuration of an aspherical surface used as the incident surface of the lens prism constituting the third lens unit. This aspherical surface has a curvature increasing from the center to the edge along the height. Since the positions of the luminous fluxes passing through this surface do not change for the same image height even when zooming is performed, astigmatism and spherical aberration appearing on the under side are excellently corrected in the entire zoom range.

FIGS. 12A to 12I show differences in aberrations between when the incident surface of the lens prism of the third lens unit is spherical and when it is aspherical. The dotted lines show aberrations when the surface is spherical, and the solid lines show aberrations when the surface is aspherical. As is understood from theses figures, spherical aberration is reduced at least to half or smaller by using an aspherical surface as the incident surface of the lens prism of the third lens unit, and astigmatism is reduced approximately to half by largely correcting it in the longest focal length direction.

Further, in the above embodiments, by using aspherical surfaces generally said to have a high error sensitivity as the incident surface of the lens prism whose exit surface serves as an image formed surface, errors are reduced compared to cases where other aspherical surfaces are used in the third lens unit.

As described above, in the real-image zoom finder optical system of the present invention, the objective lens system is of a three-unit arrangement of negative, positive, positive configuration and the third lens unit has a lens prism using an aspherical surface as its incident surface, so that a compact and high-zoom-ratio optical system is realized without any need to increase the number of lens elements.

When the incident surface of the lens prism serves as a real image formed surface, by using an aspherical surface as the incident surface of the lens prism, errors are reduced.

When the aspherical surface used as the incident surface of the lens prism has a curvature increasing from the center to the edge along the height, astigmatism and spherical aberration are excellently corrected in the entire zoom range.

Further, by fulfilling the condition (1), an optical system which is compact and has little aberrations is realized.

Obviously, many modifications and variations of the present invention are possible in light of the above teachings. It is therefore to be understood that within the scope of the appended claims, the invention may be practiced other than as specifically described.

TABLE 1

(1st Embodiment)

| Half View Angle (θ) | | 37.45 to 20.19 | | |
|---|---|---|---|---|
| Finder Magnification | | 0.283 to 0.531 | | |
| <Construction Data> | | | | |
| Surface No. | CR | T | Ne | ve |
| 1* | 68.38 | | | |
| | | 1.00 | 1.58752 | 30.24 |
| 2 | 6.93 | | | |
| | | T1 | | |
| 3 | 20.00 | | | |
| | | 3.60 | 1.49329 | 57.64 |
| 4* | −7.11 | | | |
| | | T2 | | |
| 5* | 15.00 | | | |
| | | 16.05 | 1.58752 | 30.24 |
| 6 | ∞ | | | |
| | | 3.00 | | |
| 7 | 14.00 | | | |
| | | 15.85 | 1.57177 | 34.49 |
| 8 | ∞ | | | |
| | | 4.79 | | |
| 9* | 24.78 | | | |
| | | 2.50 | 1.49329 | 57.64 |
| 10 | −15.50 | | | |
| | | 13.00 | | |
| 11 | ∞ | | | |

*:Aspherical surface

<Aspherical Surface Data>

| Surface No. | ε | A4 | A6 | A8 | A10 |
|---|---|---|---|---|---|
| 1* | 1.02 | 1.24E-04 | −7.61E-07 | 1.17E-09 | 0 |
| 4* | 0.0012 | −9.21E-05 | 4.06E-06 | 4.91E-09 | 0 |
| 5* | −15.5 | 4.07E-04 | −6.61E-06 | −1.35E-08 | −3.16E-10 |
| 9* | 1 | −1.25E-04 | 0 | −1.00E-08 | 0 |

TABLE 1-continued

<Distance Variation Due to Zooming>

| Position | WIDE | MIDDLE | TELE |
|---|---|---|---|
| Finder Magnification | 0.28 | 0.39 | 0.53 |
| T1 | 14.77 | 9.75 | 6.09 |
| T2 | 0.38 | 2.84 | 6.21 |

<Values for Conditions>
$\phi 30/\phi 20 : 1.59$
$\phi 20 : 0.02466$
$\phi 30 : 0.03917$

TABLE 2

(2nd Embodiment)

Half View Angle ($\theta$)  33.29 to 14.58
Finder Magnification  0.304 to 0.685

<Construction Data>

| Surface No. | CR | T | Ne | ve |
|---|---|---|---|---|
| 1* | 25.20 | | | |
| | | 1.00 | 1.58752 | 30.24 |
| 2* | 5.77 | | | |
| | | T1 | | |
| 3 | 14.26 | | | |
| | | 3.60 | 1.49329 | 57.64 |
| 4* | −8.28 | | | |
| | | T2 | | |
| 5* | 15.00 | | | |
| | | 16.05 | 1.58752 | 30.24 |
| 6 | ∞ | | | |
| | | 3.00 | | |
| 7 | 16.00 | | | |
| | | 15.85 | 1.57177 | 34.49 |
| 8 | ∞ | | | |
| | | 4.85 | | |
| 9* | 24.78 | | | |
| | | 2.50 | 1.49329 | 57.64 |
| 10 | −15.50 | | | |
| | | 13.00 | | |
| 11 | ∞ | | | |

*:Aspherical surface

<Aspherical Surface Data>

| Surface No. | $\epsilon$ | A4 | A6 | A8 | A10 |
|---|---|---|---|---|---|
| 1* | 13.3 | 7.56E-05 | −1.77E-05 | 7.50E-08 | 0 |
| 2* | 0.901 | −2.47E-04 | 1.54E-06 | −3.22E-06 | 3.00E-08 |
| 4* | −0.139 | −6.78E-05 | 2.92E-06 | 1.06E-07 | 0 |
| 5* | −19 | 3.65E-04 | −9.54E-06 | −5.33E-07 | 3.96E-08 |
| 9* | 1 | −1.25E-04 | 0 | −2.40E-08 | 0 |

<Distance Variation Due to Zooming>

| Position | WIDE | MIDDLE | TELE |
|---|---|---|---|
| Finder Magnification | 0.30 | 0.46 | 0.69 |
| T1 | 13.72 | 8.08 | 4.35 |
| T2 | 1.00 | 4.74 | 10.34 |

<Values for Conditions>
$\phi 30/\phi 20 : 1.13$
$\phi 20 : 0.03459$
$\phi 30 : 0.03916$

TABLE 3

(3rd Embodiment)

Half View Angle ($\theta$)  33.29 to 14.58
Finder Magnification  0.304 to 0.685

<Construction Data>

| Surface No. | CR | T | Ne | ve |
|---|---|---|---|---|
| 1* | 68.38 | | | |
| | | 1.00 | 1.58752 | 30.24 |
| 2 | 6.93 | | | |
| | | T1 | | |
| 3 | 20.00 | | | |
| | | 3.60 | 1.49329 | 57.64 |
| 4* | −7.11 | | | |
| | | T2 | | |
| 5* | 15.00 | | | |
| | | 16.05 | 1.58752 | 30.24 |
| 6 | ∞ | | | |
| | | 3.00 | | |
| 7 | 16.00 | | | |
| | | 15.85 | 1.57177 | 34.49 |
| 8 | ∞ | | | |
| | | 4.85 | | |
| 9* | 24.78 | | | |
| | | 2.50 | 1.49329 | 57.64 |
| 10 | −15.50 | | | |
| | | 13.00 | | |
| 11 | ∞ | | | |

*:Aspherical surface

<Aspherical Surface Data>

| Surface No. | $\epsilon$ | A4 | A6 | A8 | A10 |
|---|---|---|---|---|---|
| 1* | 1.02 | 1.24E-04 | −7.61E-07 | 1.17E-09 | 0 |
| 4* | 0.0012 | −9.21E-05 | 4.06E-06 | 4.91E-09 | 0 |
| 5* | −15.5 | 4.07E-04 | −6.61E-06 | −1.35E-08 | 0 |
| 9* | 1 | −1.25E-04 | 0 | −2.40E-08 | 0 |

<Distance Variation Due to Zooming>

| Position | WIDE | MIDDLE | TELE |
|---|---|---|---|
| Finder Magnification | 0.30 | 0.46 | 0.69 |
| T1 | 13.18 | 7.50 | 3.73 |
| T2 | 1.00 | 4.65 | 10.11 |

<Values for Conditions>
$\phi 30/\phi 20 : 1.59$
$\phi 20 : 0.02466$
$\phi 30 : 0.03917$

TABLE 4

(4th Embodiment)

Half View Angle ($\theta$)  33.29 to 14.72
Finder Magnification  0.282 to 0.634

<Construction Data>

| Surface No. | CR | T | Ne | ve |
|---|---|---|---|---|
| 1* | −50.00 | | | |
| | | 1.00 | 1.58752 | 30.24 |
| 2 | 7.71 | | | |
| | | T1 | | |
| 3* | 11.00 | | | |
| | | 2.00 | 1.49329 | 57.64 |
| 4* | −5.94 | | | |
| | | T2 | | |
| 5* | 9.00 | | | |
| | | 10.00 | 1.49329 | 57.64 |
| 6 | ∞ | | | |
| | | 3.00 | | |
| 7 | 14.00 | | | |
| | | 15.85 | 1.57177 | 34.49 |
| 8 | ∞ | | | |
| | | 4.79 | | |

TABLE 4-continued

| | | | | |
|---|---|---|---|---|
| 9* | 24.78 | | | |
| | | 2.50 | 1.49329 | 57.64 |
| 10 | −15.50 | | | |
| | | 13.00 | | |
| 11 | ∞ | | | |

*:Aspherical surface

<Aspherical Surface Data>

| Surface No. | ε | A4 | A6 | A8 | A10 |
|---|---|---|---|---|---|
| 1* | 177 | −1.34E-04 | 9.21E-05 | −66.17E-06 | 0 |
| 3* | −35.3 | −1.88E-03 | 4.22E-04 | −8.05E-05 | 0 |
| 4* | 2.32 | −2.52E-03 | 4.32E-04 | −4.85E-05 | −3.16E-10 |
| 5* | −0.869 | −1.08E-03 | 1.42E-04 | −1.21E-05 | 4.35E-07 |
| 9* | 1 | −1.25E-04 | 0 | −1.00E-08 | 0 |

<Distance Variation Due to Zooming>

| Position | WIDE | MIDDLE | TELE |
|---|---|---|---|
| Finder Magnification | 0.28 | 0.42 | 0.63 |
| T1 | 8.10 | 4.03 | 1.32 |
| T2 | 2.50 | 5.22 | 9.29 |

<Values for Conditions>
φ30/φ20 : 1.22
φ20 : 0.04484
φ30 : 0.05481

TABLE 5

(5th Embodiment)

Half View Angle (θ)        33.29 to 14.58
Finder Magnification       0.304 to 0.685

<Construction Data>

| Surface No. | CR | T | Ne | νe |
|---|---|---|---|---|
| 1* | 68.38 | | | |
| | | 1.00 | 1.58752 | 30.24 |
| 2 | 6.93 | | | |
| | | T1 | | |
| 3 | 20.00 | | | |
| | | 3.60 | 1.49329 | 57.64 |
| 4* | −7.11 | | | |
| | | T2 | | |
| 5* | 15.00 | | | |
| | | 16.05 | 1.58752 | 30.24 |
| 6 | ∞ | | | |
| | | 3.00 | | |
| 7 | 16.00 | | | |
| | | 15.85 | 1.57177 | 34.49 |
| 8 | ∞ | | | |
| | | 4.85 | | |
| 9* | 24.78 | | | |
| | | 2.50 | 1.49329 | 57.64 |
| 10 | −15.50 | | | |
| | | 13.00 | | |
| 11 | ∞ | | | |

*:Aspherical surface

<Aspherical Surface Data>

| Surface No. | ε | A4 | A6 | A8 | A10 |
|---|---|---|---|---|---|
| 1* | 1.02 | 1.24E-04 | −7.61E-07 | 1.17E-09 | 0 |
| 4* | 0.0012 | −9.21E-05 | 4.06E-06 | 4.91E-09 | 0 |
| 5* | −15.5 | 4.07E-04 | −5.00E-06 | 2.00E-08 | 6.00E-10 |
| 9* | 1 | −1.25E-04 | 0 | −2.40E-08 | 0 |

TABLE 5-continued

<Distance Variation Due to Zooming>

| Position | WIDE | MIDDLE | TELE |
|---|---|---|---|
| Finder Magnification | 0.30 | 0.46 | 0.69 |
| T1 | 13.18 | 7.50 | 4.65 |
| T2 | 1.00 | 3.73 | 10.10 |

<Values for Conditions>
φ30/φ20 : 1.59
φ20 : 0.02466
φ30 : 0.03917

What is claimed is:

1. A real-image zoom finder optical system comprising, from an object side, an objective lens system of a positive refractive power and an eyepiece system of a positive refractive power, said objective lens system including, along an optical axis, from the object side, a first lens unit of a negative refractive power, a second lens unit of a positive refractive power and a third lens unit of a positive refractive power, zooming being performed by moving the first and second lens units along the optical axis, wherein each of the first and second lens units comprises a single lens including at least one aspherical surface and wherein the third lens unit includes a lens prism which has at least one reflecting surface and at least an incident surface which is an aspherical surface, wherein said aspherical surface used as the incident surface of the lens prism has a curvature increasing from a center to an edge along a height traverse to the optical axis.

2. A real-image zoom finder optical system as claimed in claim 1, wherein said incident surface of the lens prism functions as a real image formed surface.

3. A real-image zoom finder optical system as claimed in claim 1, wherein said second and third lens units of the objective lens system fulfill the following condition:

$$1 < \frac{\phi_{30}}{\phi_{20}} < 1.6$$

where $\phi_{n0}$ is a refractive power of a most object side surface of an nth lens unit, and $$\phi_{n0} = \frac{N_{n0} - 1}{r_{n0}}$$

where $N_{n0}$ is a refractive index of the most object side lens element or lens prism of the nth lens unit, and $r_{n0}$ is a radius of curvature of the most object side surface of the nth lens unit.

4. A real-image zoom finder optical system comprising, from an object side, an objective lens system of a positive refractive power and an eyepiece system of a positive refractive power, said objective lens system including, along an optical axis, from the object side, a first lens unit of a negative refractive power, a second lens unit of a positive refractive power and a third lens unit of a positive refractive power, zooming being performed by moving the first and second lens units along the optical axis, wherein each of the first and second lens units comprises a single lens and at least one of the first and second lens units includes at least one aspherical surface and wherein the third lens unit includes a lens prism which has at least one reflecting surface and at least an incident surface, the lens prism having at least one aspherical surface, wherein said aspherical surface is used as the incident surface of the lens prism and has a curvature increasing from a center to an edge along a height traverse to the optical axis.

5. A real-image zoom finder optical system as claimed in claim 4, wherein said incident surface of the lens prism functions as a real image formed surface.

6. A real-image zoom finder optical system as claimed in claim 4, wherein said second and third lens units of the objective lens system fulfill the following condition:

$$1 < \frac{\phi_{30}}{\phi_{20}} < 1.6$$

where $\phi_{n0}$ is a refractive power of a most object side surface of an nth lens unit, and $$\phi_{n0} = \frac{N_{n0} - 1}{r_{n0}}$$

where $N_{n0}$ is a refractive index of the most object side lens element or lens prism of the nth lens unit, and $r_{n0}$ is a radius of curvature of the most object side surface of the nth lens unit.

7. A real-image zoom finder optical system comprising, from an object side, an objective lens system of a positive refractive power and an eyepiece system of a positive refractive power, said objective lens system including, along an optical axis, from the object side, a first lens unit of a negative refractive power, a second lens unit of a positive refractive power and a third lens unit of a positive refractive power, zooming being performed by moving the first and second lens units along the optical axis, wherein each of the first and second lens units comprises a single lens including at least one aspherical surface and wherein the third lens unit includes a lens prism which has at least one reflecting surface and at least an incident surface which is an aspherical surface, wherein said incident surface of the lens prism functions as a real image formed surface.

8. A real-image zoom finder optical system comprising, from an object side, an objective lens system of a positive refractive power and an eyepiece system of a positive refractive power, said objective lens system including, along an optical axis, from the object side, a first lens unit of a negative refractive power, a second lens unit of a positive refractive power and a third lens unit of a positive refractive power, zooming being performed by moving the first and second lens units along the optical axis, wherein each of the first and second lens units comprises a single lens and at least one of the first and second lens units includes at least one aspherical surface and wherein the third lens unit includes a lens prism which has at least one reflecting surface and at least an incident surface, the lens prism having at least one aspherical surface, wherein said incident surface of the lens prism functions as a real image formed surface.

9. A real-image zoom finder optical system comprising, from an object side, an objective lens system of a positive refractive power and an eyepiece system of a positive refractive power, said objective lens system including, from the object side, a first lens unit of a negative refractive power, a second lens unit of a positive refractive power and a third lens unit of a positive refractive power, zooming being performed by moving the first and second lens units along the optical system, wherein each of the first and second lens units comprises a single lens including at least one aspherical surface and wherein the third lens unit includes a lens prism which has at least one reflecting surface and at least an incident surface which is an aspherical surface, wherein the refractive powers of said second lens unit $\phi_{20}$ and third lens unit $\phi_{30}$ of the objective lens system fulfill the following condition:

$$1 < \frac{\phi_{30}}{\phi_{20}} < 1.6$$

where $\phi_{n0}$ is a refractive power of a most object side surface of an nth lens unit, and $$\phi_{n0} = \frac{N_{n0} - 1}{r_{n0}}$$

where $N_{n0}$ is a refractive index of the most object side lens element or lens prism of the nth lens unit, and $r_{n0}$ is a radius of curvature of the most object side surface of the nth lens unit.

10. A real-image zoom finder optical system comprising, from an object side, an objective lens system of a positive refractive power and an eyepiece system of a positive refractive power, said objective lens system including, from the object side, a first lens unit of a negative refractive power, a second lens unit of a positive refractive power and a third lens unit of a positive refractive power, zooming being performed by moving the first and second lens units along the optical system, wherein each of the first and second lens units comprises a single lens and at least one of the first and second lens units includes at least one aspherical surface and wherein the third lens unit includes a lens prism which has at least one reflecting surface and at least an incident surface, the lens prism having at least one aspherical surface, wherein the refractive powers of said second lens unit $\phi_{20}$ and third lens unit $\phi_{30}$ of the objective lens system fulfill the following condition:

$$1 < \frac{\phi_{30}}{\phi_{20}} < 1.6$$

where $\phi_{n0}$ is a refractive power of a most object side surface of an nth lens unit, and $$\phi_{n0} = \frac{N_{n0} - 1}{r_{n0}}$$

where $N_{n0}$ is a refractive index of the most object side lens element or lens prism of the nth lens unit, and $r_{n0}$ is a radius of curvature of the most object side surface of the nth lens unit.

11. A real-image zoom finder optical system comprising, from an object side, an objective lens system of a positive refractive power and an eyepiece system of a positive refractive power, said objective lens system including, from the object side:

a first lens unit consisting of a single lens which has a negative refractive power and which includes at least one aspherical surface;

a second lens unit which comprises a single lens including at least one aspherical surface and which has a positive refractive power as a whole; and a third lens unit of a positive refractive power, wherein zooming is performed by moving said first and second lens units along the optical system, wherein said third lens unit includes a lens prism which has at least one reflecting surface and at least an incident surface which is an aspherical surface.

12. A real-image zoom finder optical system as claimed in claim 11, wherein said incident surface of the lens prism functions as a real image formed surface.

* * * * *